United States Patent
Goodchild et al.

(10) Patent No.: US 9,130,772 B1
(45) Date of Patent: Sep. 8, 2015

(54) METHODS, SYSTEMS, AND COMPUTER PROGRAM PRODUCTS FOR ADAPTIVE INVERSE PACKET MULTIPLEXING IN WHICH TRAFFIC ALLOCATION IS DYNAMICALLY ADJUSTABLE ON INDIVIDUAL LINKS

(75) Inventors: Gregory W. Goodchild, Cary, NC (US); Ian A. Rooze, Raleigh, NC (US); Mark Crane Wartski, Raleigh, NC (US)

(73) Assignee: Overture Networks, Inc., Newton, MA (US)

( * ) Notice: Subject to any disclaimer, the term of this patent is extended or adjusted under 35 U.S.C. 154(b) by 4038 days.

(21) Appl. No.: 10/438,709

(22) Filed: May 15, 2003

Related U.S. Application Data (60) Provisional application No. 60/381,155, filed on May 16, 2002.

(51) Int. Cl.
*H04L 12/28* (2006.01)

(52) U.S. Cl.
CPC ................... *H04L 12/2863* (2013.01)

(58) Field of Classification Search
CPC .................................. H04L 12/1863
USPC ......... 370/229, 445, 355–539, 542–543, 394, 370/474, 535–537
See application file for complete search history.

(56) References Cited

U.S. PATENT DOCUMENTS

| | | | | |
|---|---|---|---|---|
| 5,583,792 A | * | 12/1996 | Li et al. ...................... | 709/224 |
| 6,222,858 B1 | * | 4/2001 | Counterman ................ | 370/474 |

OTHER PUBLICATIONS

K. Sklower et al, RFC 1990, "The PPP Multilink Protocol (MP)", ftp://ftp.rfc-editor.org/in-notes/rfc1990.txt, Aug. 1996.*
Andrew S. Tanenbaum, "Computer networks", 3rd Edition, © 1996, pp. 451-452.*
Fosmark, Klaus, "Loop Aggregation," FirstMile Systems, pp. 1-15 (Nov. 2001).

* cited by examiner

*Primary Examiner* — Jianye Wu
(74) *Attorney, Agent, or Firm* — Myers Bigel Sibley & Sajovec, PA (57) ABSTRACT

A packet is communicated between a first node and a second node by assigning a plurality of packet fragments to a plurality of communication links connecting the first node and the second node, respectively, such that respective sizes of the plurality of packet fragments are based on respective bandwidths of the plurality of communication links. The plurality of packet fragments is transmitted on the plurality of communication links from the first node to the second node. The plurality of packet fragments is then reassembled at the second node upon receipt.

36 Claims, 9 Drawing Sheets

FIG. 11

METHODS, SYSTEMS, AND COMPUTER PROGRAM PRODUCTS FOR ADAPTIVE INVERSE PACKET MULTIPLEXING IN WHICH TRAFFIC ALLOCATION IS DYNAMICALLY ADJUSTABLE ON INDIVIDUAL LINKS

RELATED APPLICATIONS

This application claims the benefit of Provisional Application No. 60/381,155, filed May 16, 2002, the disclosure of which is hereby incorporated herein by reference.

BACKGROUND OF THE INVENTION

The present invention relates to packet communication methods, systems, and computer program products, and, more particularly, to methods, systems, and computer program products for inverse packet multiplexing.

Inverse multiplexing can generally be described as a logical bonding of multiple instances of transmission media to provide greater aggregated bandwidth over a logical path than could otherwise be provided using a single instance of transmission medium. Inverse multiplexing is typically used to create higher bandwidth pipes across a span of network segments whose individual transmission elements cannot support the total end point offered load.

For example, carriers have deployed significant bandwidth capacity in recent years through the construction of long haul and metro optical networks. Concurrently, enterprise networks, often based on Ethernet technology, have steadily increased their bandwidth capabilities from 10 Mb/s to 1 Gb/s. Unfortunately, there has not been a network build-up to link these enterprise networks with the newly deployed carrier facilities. Presently, most of a carrier's customer base is connected through existing outside plant copper pairs. These copper pair spans, however, have technical bandwidth limitations, which can make it difficult to take advantage of the greater bandwidth capabilities of the enterprise networks and/ or the carrier's optical networks.

Existing copper transmission technologies are often limited in bandwidth and/or reach. For example, one DSL technology, ITU 991.2 (G.shdsl) provides for logical bonding of multiple copper transmission media; however, the number of physical paths that can be bonded is limited to two. Another DSL technology known as VDSL can support low-end Ethernet transmission speeds, but is limited to a reach of approximately two thousand feet.

Figure 1:
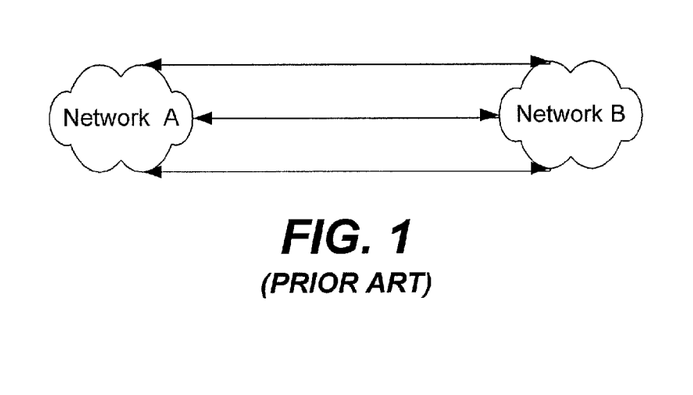
FIG. 1 is a block diagram that illustrates a pair of networks connected by multiple communication links.
Figure 2:
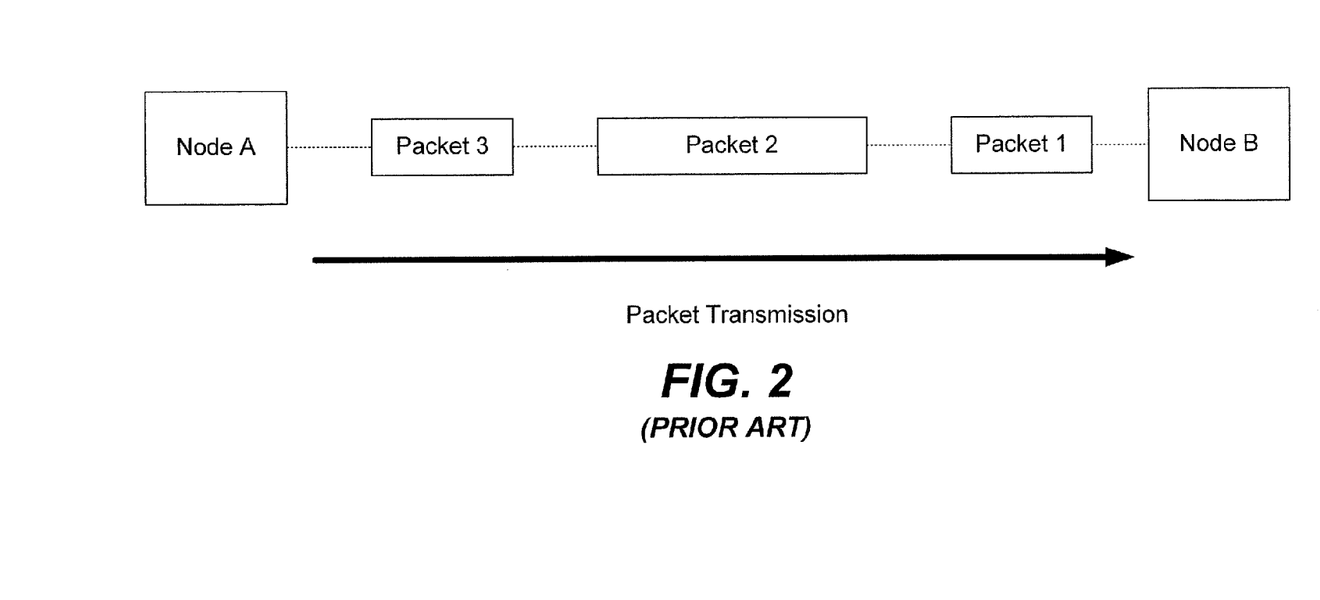
FIG. 2 is a block diagram that illustrates packet transmission between nodes respectively associated with a pair of networks.
Figure 3:
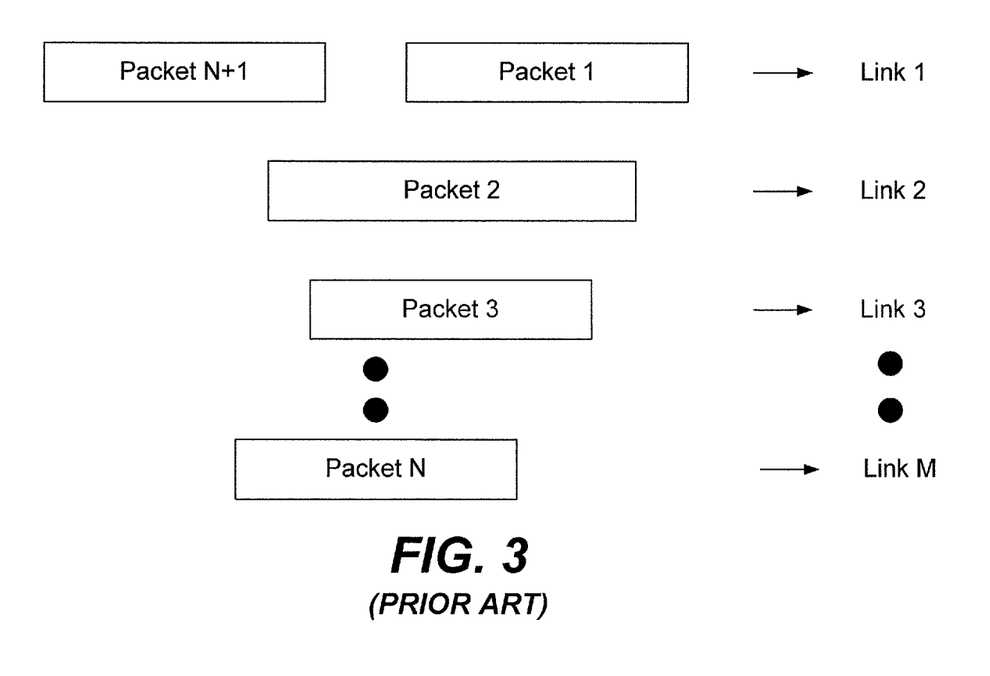
FIG. 3 is a block diagram that illustrates conventional inverse packet multiplexing over multiple communication links.

FIG. 1 illustrates a network model in which two networks A and B are connected by multiple physical media spans. As shown in FIG. 2, each network has at its interface a network element or node. In the example shown, packets are being transmitted from Node A at Network A to Node B at Network B. One approach to utilizing the multiple spans or links connecting Network A to Network B would be to demultiplex packets across the various links as shown in FIG. 3 on a per-packet basis. Unfortunately, this approach may not be desirable in some cases. Latency may be higher than desirable if there is less offered load than the total available aggregate link bandwidth. By demultiplexing the packets on a per packet basis, the latency incurred is equal to that caused by the active links. That is, the latency for an individual packet will be based on the particular bandwidth for the individual link on which the packet was transmitted. In addition, link bandwidth may be underutilized if only a subset of links is carrying packet traffic.

SUMMARY OF THE INVENTION

According to some embodiments of the present invention, a packet is communicated between a first node and a second node by assigning a plurality of packet fragments to a plurality of communication links connecting the first node and the second node, respectively, such that respective sizes of the plurality of packet fragments are based on respective bandwidths of the plurality of communication links. The plurality of packet fragments is transmitted on the plurality of communication links from the first node to the second node. The plurality of packet fragments is then reassembled at the second node upon receipt. By demultiplexing packets using a finer granularity, i.e., at the packet fragment level, latency may be reduced. In addition to improving latency, aggregate bandwidth may be better utilized than in the case where packets are allocated to communication links on a per-packet basis. This is because the offered load is spread out across all available communication links even if the number of packets to be transmitted is less than the total number of available communication links.

In other embodiments of the present invention, a plurality of transmit FIFOs are associated with the plurality of communication links, respectively. A plurality of virtual full thresholds are defined for the plurality of transmit FIFOs, respectively, based on the respective bandwidths of the plurality of communication links associated therewith. The packet fragments are assigned to the plurality of communication links by filling each one of the plurality of transmit FIFOs with data from the packet sequentially until the respective virtual full threshold defined for the one of the plurality of transmit FIFOs is reached or the entire packet has been loaded into the plurality of transmit FIFOs.

In still other embodiments of the present invention, a plurality of virtual empty thresholds are defined for the plurality of transmit FIFOs, respectively, based on the respective bandwidths of the plurality of communication links associated therewith. The plurality of transmit FIFOs are filled with data by filling a respective one of the plurality of transmit FIFOs with data from the packet until the respective virtual full threshold defined for the respective one of the plurality of transmit FIFOs is reached before filling others of the plurality of transmit FIFOs with data from the packet if an amount of data contained in the respective one of the plurality of transmit FIFOs does not exceed the respective virtual empty threshold defined for the respective one of the plurality of transmit FIFOs.

In still other embodiments of the present invention, a plurality of link advance thresholds are defined for the plurality of transmit FIFOs, respectively, based on the respective bandwidths of the plurality of communication links associated therewith. The plurality of transmit FIFOs are filled with data by filling a respective one of the plurality of transmit FIFOs with data from the packet until the respective virtual full threshold defined for the respective one of the plurality of transmit FIFOs is reached or the entire packet has been loaded into the plurality of transmit FIFOs if an amount of data contained in the respective one of the plurality of transmit FIFOs does not exceed the respective link advance threshold defined for the respective one of the plurality of transmit FIFOs.

In further embodiments of the present invention, a respective one of the plurality of communication links is dropped by not assigning any of the plurality of packet fragments to the respective one of the plurality of communication links.

In still further embodiments of the present invention, the plurality of packet fragments comprise a plurality of delineated packet fragments, each delineated packet fragment comprising a packet fragment header and at least one delineation flag. A packet fragment header may comprise a fragment sequence number, a start of packet bit that is set if a packet fragment is a first fragment of a packet, an end of packet bit that is set if a packet fragment is a last fragment of a packet, and/or a cyclic redundancy check that is calculated for the packet fragment header.

In still further embodiments of the present invention, the packet is reconstructed by reassembling the plurality of packet fragments at the second node. The plurality of packet fragments is reassembled by receiving one of the plurality of packet fragments at the second node. A timer is started responsive to receiving the one of the plurality of packet fragments at the second node. The fragment sequence numbers associated with all received packet fragments are examined responsive to expiration of the timer. A first packet fragment is selected having a lowest sequence number associated therewith. The lowest sequence number is incremented to obtain an incremented sequence number. The fragment sequence numbers associated with all received packet fragments are examined responsive to incrementing the lowest sequence number. A second packet fragment is associated with the first packet fragment if the second packet fragment has a sequence number associated therewith that matches the incremented sequence number.

In still further embodiments of the present invention, assigning the plurality of packet fragments to the plurality of communication links, transmitting the plurality of packet fragments on the plurality of communication links, and reassembling the plurality of packet fragments are performed at the interface between the physical layer and the data link layer.

Although described above primarily with respect to method embodiments of the present invention, it will be understood that the present invention may be embodied as methods, systems, and/or computer program products.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

Embodiments of the present invention are described herein in the context of processing a packet. It will be understood that the term "packet" means a unit of information and/or a block of data that may be transmitted electronically as a whole or via segments from one device to another. Accordingly, as used herein, the term "packet" may encompass such terms of art as "frame" and/or "message," which may also be used to refer to a unit of transmission.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described herein with reference to flowchart and/or block diagram illustrations of methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 4:
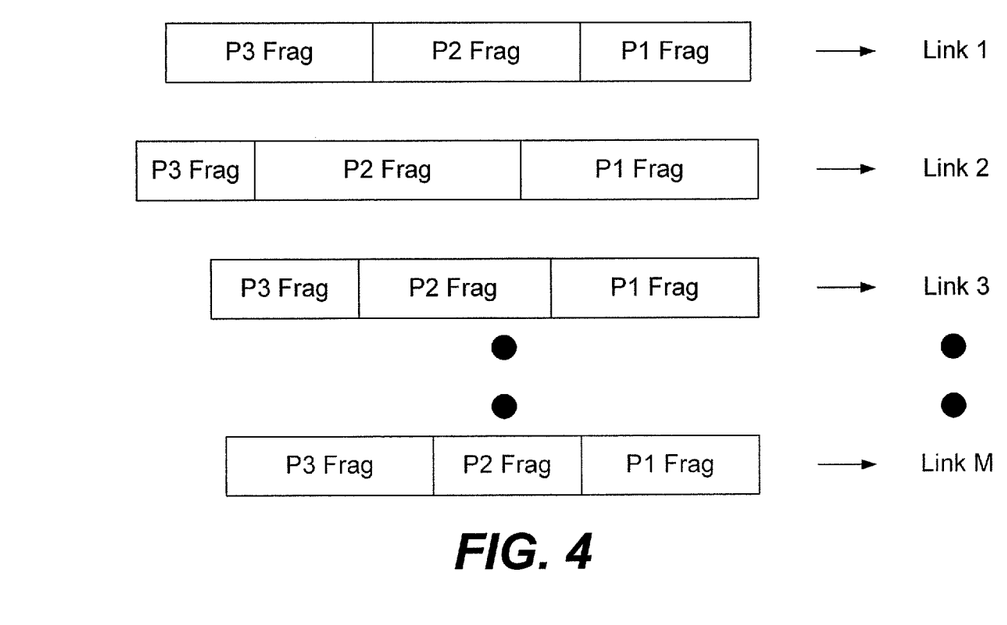
FIG. 4 is a block diagram that illustrates adaptive inverse packet multiplexing in accordance with some embodiments of the present invention.

FIG. 4 is a block diagram that illustrates adaptive inverse packet multiplexing in accordance with some embodiments of the present invention. As shown in FIG. 4, packets are allocated to individual communication links for transmission by fragmenting each packet and then allocating the packet fragments to respective communication links based on the bandwidths of the respective communication links. By demultiplexing packets using a finer granularity, i.e., at the packet fragment level, latency may be reduced. In general, the size of a particular packet fragment allocated to a particular communication link will be based on that link's dynamically realizable bandwidth. For purposes of illustration, assume that all communication links have the same bandwidth. In this case, if M communication links are available between communication nodes, then latency may be reduced by 1/M. In addition to improving latency, aggregate bandwidth may be better utilized than in the case where packets are allocated to communication links on a per-packet basis. This is because the offered load is spread out across all available communication links even if the number of packets to be transmitted is less than the total number of available communication links.

Figure 5:
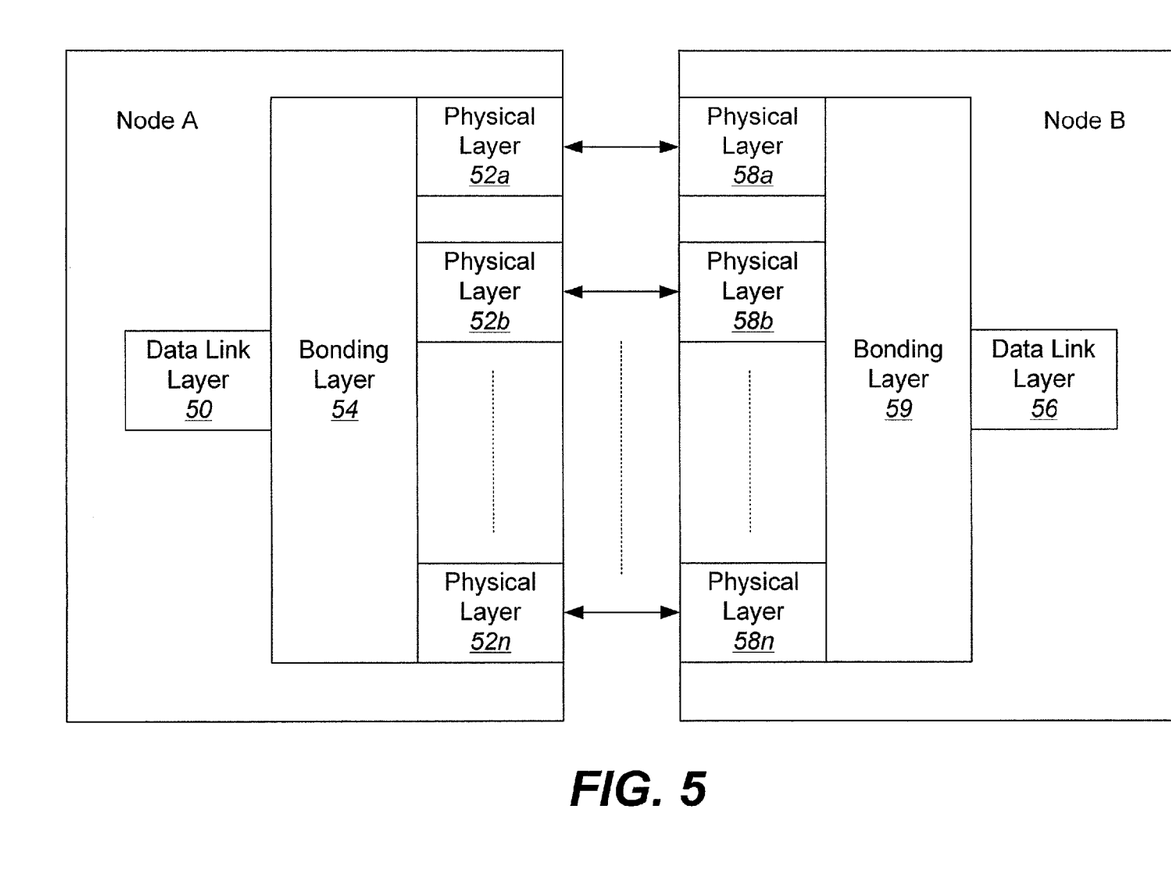
FIG. 5 is a block diagram that illustrates a functional architecture for communication nodes implementing adaptive inverse packet multiplexing in accordance with some embodiments of the present invention.

Referring now to FIG. 5, a functional architecture for communication nodes implementing adaptive inverse packet multiplexing in accordance with some embodiments of the present invention will now be described. Two network Nodes A and B are connected by a plurality of communication links. Node A comprises, among other things, a data link layer module 50 and a plurality of physical layer modules 52a, 52b, and 52n. Node A further comprises a bonding layer module 54 that provides an interface between the data link layer module 50 and the physical layer modules 52a, 52b, and 52n. Similarly, Node B comprises, among other things, a data link layer module 56 and a plurality of physical layer modules 58a, 58b, and 58n. Node B further comprises a bonding layer module 59 that provides an interface between the data link layer module 56 and the physical layer modules 58a, 58b, and 58n. Advantageously, according to some embodiments of the present invention, the bonding layer modules 54 and 59 for managing adaptive inverse multiplexing reside at the interface between the link layer and the physical layer of the ISO communication protocol. This may allow adaptive inverse multiplexing of packets to be performed without the specific knowledge of the actual current link bandwidths or the impact of lower level bandwidth non-linearities that may be due to delineation processing and/or coding schemes. Thus, adaptive inverse packet multiplexing, according to some embodiments of the present invention, is not limited to particular underlying transmission technologies or protocols.

Figure 6:
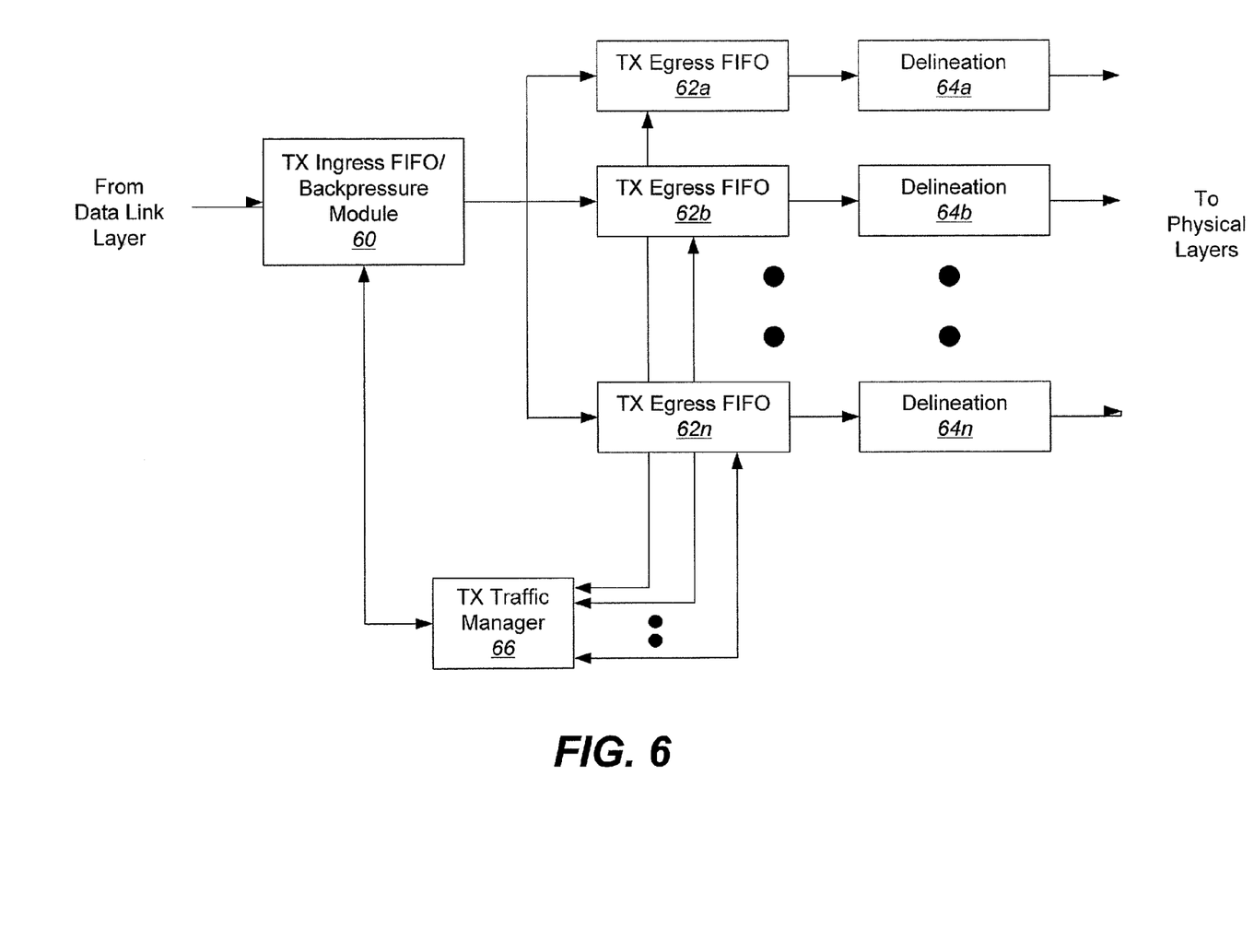
FIG. 6 is a block diagram that illustrates an adaptive inverse packet multiplexing transmission architecture in accordance with some embodiments of the present invention.

FIG. 6 is a block diagram that illustrates an adaptive inverse packet multiplexing transmission architecture in accordance with some embodiments of the present invention. The transmission architecture shown in FIG. 6 may be used in the bonding layers 54 and 59 of FIG. 5. Referring now to FIG. 6, the transmission architecture comprises a transmit ingress FIFO/backpressure module 60, a plurality of transmit egress FIFOs 62a, 62b, and 62n, a plurality of delineation modules 64a, 64b, and 64n, and a transmit traffic manager 66 that are connected as shown. The transmit ingress FIFO/backpressure module 60 may be configured to receive packets from the data link layer and to notify the transmit traffic manager 60 when a packet has been received. The transmit ingress FIFO/backpressure module 60 may also include a backpressure mechanism that cooperates with the data link layer to ensure that the FIFO does not overflow with incoming packets.

Figure 7:
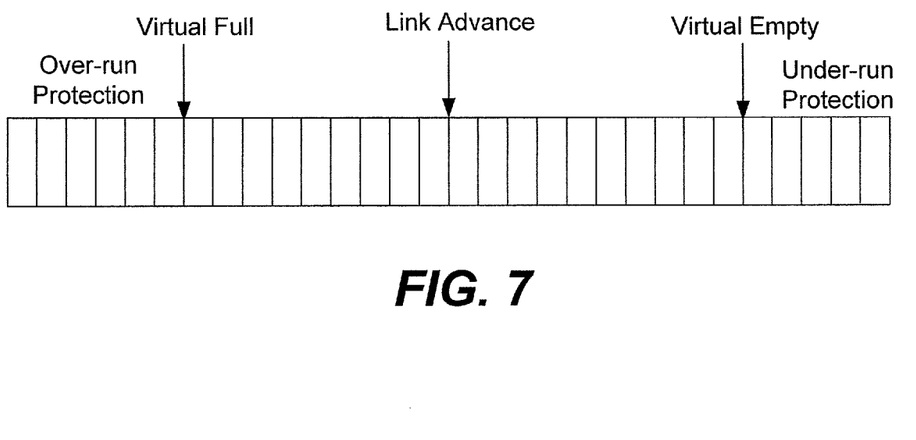
FIG. 7 is a block diagram that illustrates a transmission FIFO for use in adaptive inverse packet multiplexing in accordance with some embodiments of the present invention.

The transmit egress FIFOs 62a, 62b, and 62n are respectively associated with a plurality of communication links connecting two network nodes and may have several thresholds defined therefor. Referring now to FIG. 7, each transmit egress FIFO 62a, 62b, and 62n may have a virtual empty threshold, a virtual full threshold, and/or a link advance threshold. The virtual empty threshold ensures that all transmit egress FIFOs 62a, 62b, and 62n are filled to some level, if possible, to prevent under-run and under utilization of the aggregate bandwidth available on the plurality of communication links. The virtual full threshold is selected based on the bandwidth of the particular communication link associated with the particular transmit egress FIFO 62a, 62b, and 62n so as achieve a balance between reducing fragmentation, i.e., processing overhead, and reducing latency/improving aggregate bandwidth utilization. The link advance threshold may be used to prevent any new packet fragment from being allocated to a particular transmit egress FIFO 62a, 62b, and 62n if the FIFO depth exceeds this level to reduce fragmentation. Thus, because fragments are allocated to the transmit egress FIFOs 62a, 62b, and 62n based on the particular thresholds discussed above, fragment size is dynamically adjusted for each communication link and is not fixed.

Figure 8:
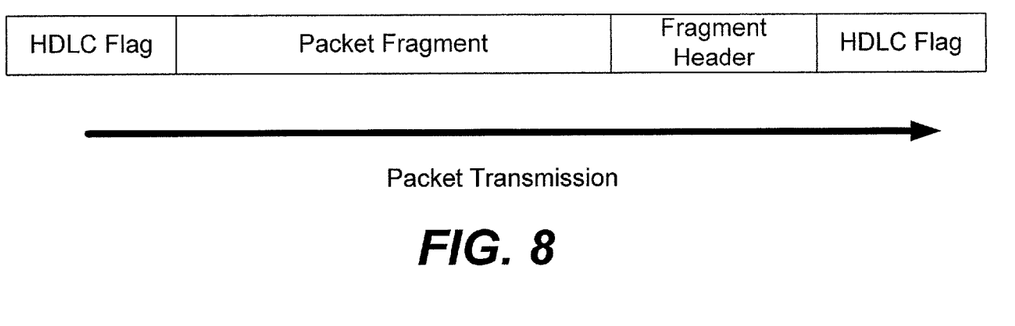
FIG. 8 is a block diagram that illustrates a delineated packet fragment for use in adaptive inverse packet multiplexing in accordance with some embodiments of the present invention.

Returning to FIG. 6, the plurality of delineation modules 64a, 64b, and 64n may be configured to delineate packet fragments received from the transmit egress FIFOs 62a, 62b, and 62n by adding a fragment header and one or more delineation flags as shown in FIG. 8. The delineation flags may be implemented using the high-level data link control (HDLC) protocol in accordance with some embodiments of the present invention. The fragment header may comprise a sequence number, a start of packet bit, an end of packet bit, and a cyclic redundancy check (CRC). The sequence number is a unique number assigned to each packet fragment. The size, i.e., number of bits allocated for the sequence number, may be based on the bandwidth or propagation disparity between the communication links. The start of packet and end of packet bits are used to delineate packets. Although both bits are not needed, using both bits may be beneficial to provide additional reliability on error prone links. According to some embodiments of the present invention, the CRC is performed only on the fragment header.

Figure 9:
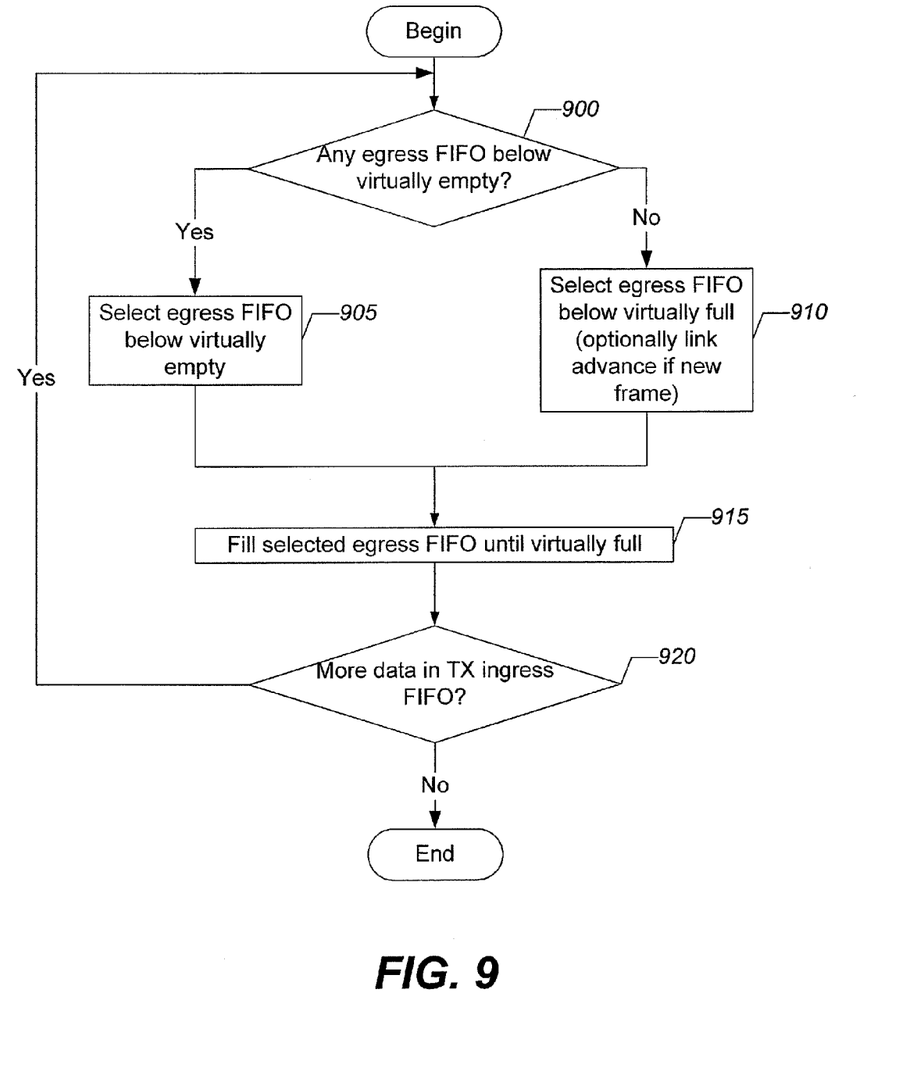
FIG. 9 is a flowchart that illustrates transmit operations for adaptive inverse packet multiplexing in accordance with some embodiments of the present invention.

Returning to FIG. 6, the transmit traffic manager 66 coordinates adaptive inverse multiplexing according to some embodiments of the present invention. Operations of the transmit traffic manager 66 will be described with reference to FIGS. 9 and 6. Referring now to FIG. 9, operations begin at block 900 where the transmit traffic manager 66 evaluates the transmit egress FIFOs 62a, 62b, and 62n to determine if any are below the virtual empty threshold in response to receiving notification from the transmit ingress FIFO/backpressure module 60 that a packet has been received from the data link layer. At block 905, if one of the transmit egress FIFOs 62a, 62b, and 62n is below the virtual empty threshold, then that FIFO is selected. Otherwise, at block 910, a transmit egress FIFOs 62a, 62b, and 62n that is below virtual full, or optionally below the link advance threshold if this is a new packet, is selected. At block 915, the transmit traffic manager 66 fills the selected egress FIFO with packet data until the selected egress FIFO reaches the virtual full threshold. A determination is made at block 920 if more packet data remains in the transmit ingress FIFO/backpressure module 60. If so, then operations continue at block 900; otherwise, operations end for that particular packet.

Figure 10:
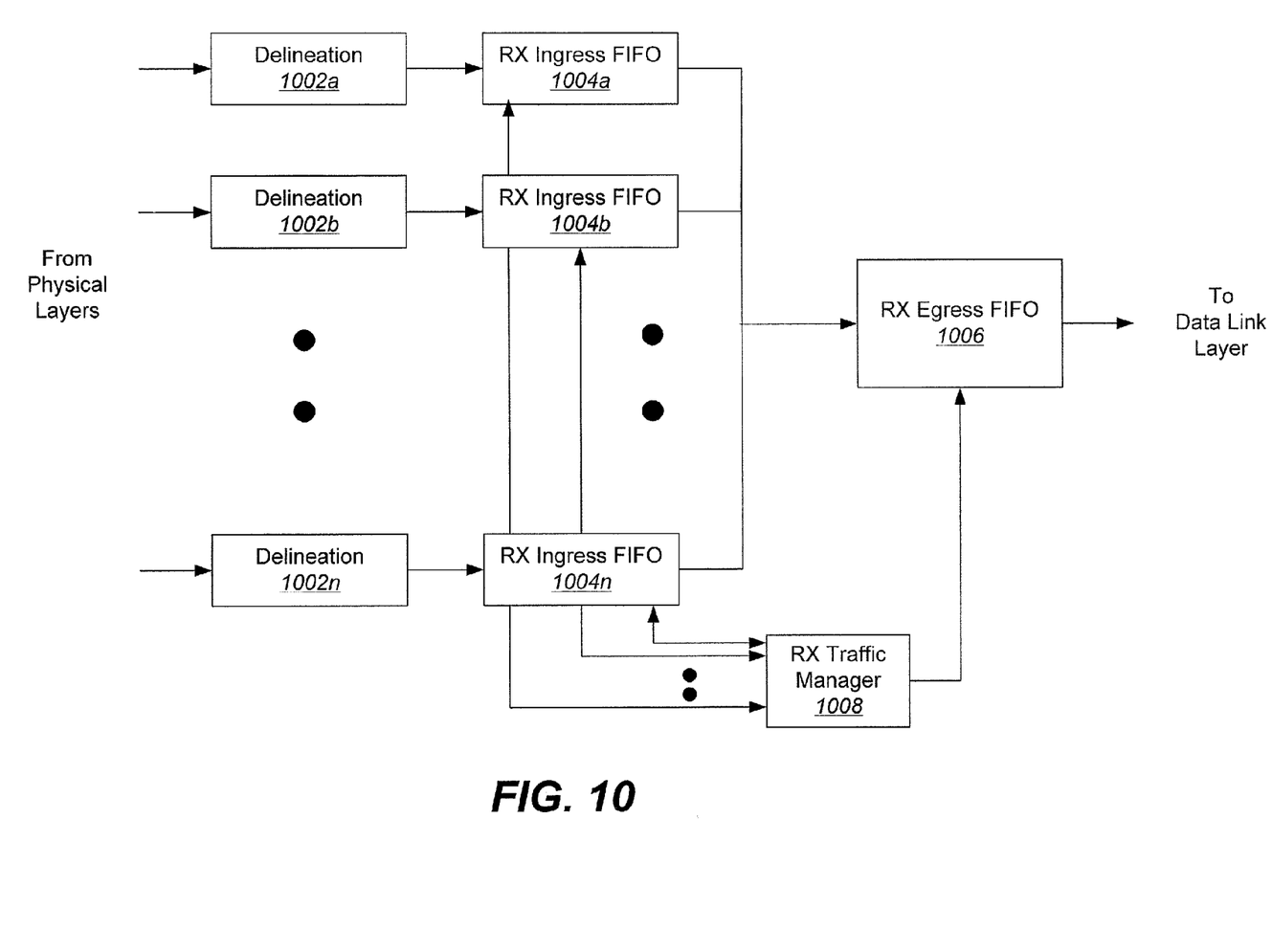
FIG. 10 is a block diagram that illustrates an adaptive inverse packet multiplexing receive architecture in accordance with some embodiments of the present invention.

FIG. 10 is a block diagram that illustrates an adaptive inverse packet multiplexing receive architecture in accordance with some embodiments of the present invention. The receive architecture shown in FIG. 10 may be used in the bonding layers 54 and 59 of FIG. 5. Referring now to FIG. 10, the receive architecture comprises a plurality of delineation modules 1002a, 1002b, and 1002n, a plurality of receive ingress FIFO modules 1004a, 1004b, and 1004n, a receive egress FIFO 1006, and a receive traffic manager 1008 that are connected as shown. The plurality of delineation modules 1002a, 1002b, and 1002n are respectively associated with the plurality of communication links and receive packet fragments from, for example, the physical layer modules 52a, 52b, 52n, 58a, 58b, and 58n of FIG. 5. The delineation modules 1002a, 1002b, and 1002n are configured to detect and distinguish between the individual packet fragments using the delineation flags and packet fragment headers discussed above with respect to FIG. 8. The receive ingress FIFOs 1004a, 1004b, and 1004n are configured to parse the fragment header when a packet fragment arrives, check the CRC to ensure that the header information is valid, and forward the sequence number of the packet fragment to the receive traffic manager 1008. The receive egress FIFO 1006 is configured to receive packet fragments from the receive ingress FIFOs 1004a, 1004b, and 1004n at the direction of the receive traffic manager and to forward reassembled packets to the data link layer using the start of packet and end of packet flags from the fragment headers to define the start and end of the various packets.

Figure 11:
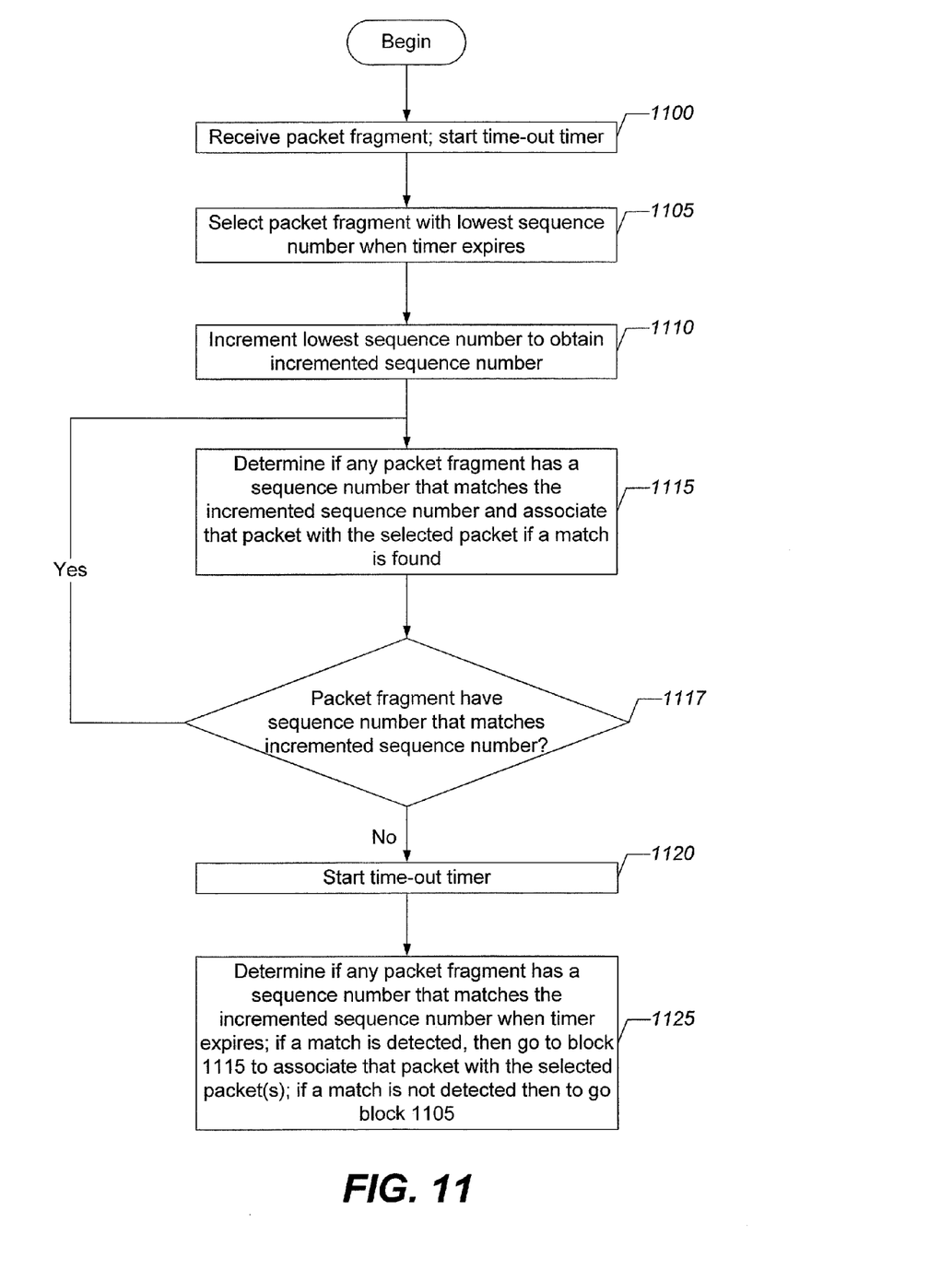
FIG. 11 is a flowchart that illustrates receive operations for adaptive inverse packet multiplexing in accordance with some embodiments of the present invention.

The receive traffic manager 1008 coordinates the reassembly of packets from the packet fragments. Operations of the receive traffic manager 1008 will now be described with reference to FIGS. 11 and 10. Referring now to FIG. 11, operations begin at block 1100 where the receive traffic manager 1008 starts a timer responsive to receiving a packet fragment in one of the receive ingress FIFOs 1004a, 1004b, and 1004n. Upon expiration of the timer, the receive traffic manager 1008 examines the fragment sequence numbers associated with all received packet fragments in the receive ingress FIFOs 1004a, 1004b, and 1004n at block 1105 and selects a first packet fragment having a lowest sequence number associated therewith to be moved to the receive egress FIFO 1006. The receive traffic manager 1008 increments the lowest sequence number to obtain an incremented sequence number at block 1110. The receive traffic manager examines the fragment sequence numbers associated with all received packet fragments in the receive ingress FIFOs 1004a, 1004b, and 1004n and associates a second packet fragment with the first packet fragment if the sequence number of the second packet fragment matches the incremented sequence number at block 1115. Blocks 1110 and 1115 are repeated until no packet fragment has a sequence number that matches the incremented sequence number (block 1117). If any of the received packet fragments have a valid sequence number, then the timer is started again at block 1120. Upon expiration of the timer, the receive traffic manager 1008 examines the fragment sequence numbers associated with all received packet fragments in the receive ingress FIFOs 1004a, 1004b, and 1004n at block 1125 and, if any of the sequence numbers match the incremented sequence number, then operations continue at block 1115; otherwise, operations continue at block 1105.

Although FIGS. 5, 6, and 10 illustrate exemplary adaptive inverse packet multiplexing architectures, it will be understood that the present invention is not limited to such configurations, but is intended to encompass any configuration capable of carrying out the operations described above. It will be appreciated that the functionality of any or all of the blocks of FIGS. 5, 6, and 10 may be implemented using one or more application specific integrated circuits (ASICs), discrete hardware components, a programmed digital signal processor or microcontroller, and/or combinations thereof. In this regard, computer program code for carrying out operations of the respective modules discussed above with respect to FIGS. 5, 6, and 10 may be written in a high-level programming language, such as C or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage.

The flowcharts of FIGS. 9 and 11 illustrate the architecture, functionality, and operations of some embodiments of systems for adaptive inverse packet multiplexing. In this regard, each block represents a module, segment, or portion of code, which comprises one or more executable instructions for implementing the specified logical function(s). It should also be noted that in other implementations, the function(s) noted in the blocks may occur out of the order noted in FIGS. 9 and 11. For example, two blocks shown in succession may, in fact, be executed substantially concurrently or the blocks may sometimes be executed in the reverse order, depending on the functionality involved.

Many variations and modifications can be made to the preferred embodiments without substantially departing from the principles of the present invention. All such variations and modifications are intended to be included herein within the scope of the present invention, as set forth in the following claims.

We claim:

1. A method of processing a packet, comprising:
   segmenting a block of data into variable length fragments for transmission over multiple links;
   assigning a fragment header that comprises a sequence number and a end-of-packet demarcation flag that indicates the end of the packet for each respective fragment;

ordering the fragments based on the sequence numbers; and invoking a reassembly procedure if at least one of the fragments is lost;

wherein segmenting the block of data, assigning the fragment header, ordering the fragments, and invoking the reassembly procedure are performed at an interface of a link layer and a physical layer; and wherein the respective lengths of the fragments allocated to the respective multiple links for transmission are based on respective dynamically realizable bandwidths for the multiple links.

2. The method of claim 1, wherein the fragment header further comprises a start-of-packet demarcation flag.

3. The method of claim 2, wherein the fragment header further comprises a cyclic redundancy check for the sequence number, end-of-packet demarcation flag, and start-of-packet demarcation flag.

4. The method of claim 1, wherein invoking the reassembly procedure comprises:

setting a timer upon receipt of one of the fragments; and declaring one of the fragments lost if the timer expires before an expected next sequence numbered fragment arrives.

5. The method of claim 4, wherein the timer has a timeout value that is a function of the latency of a slowest one of the multiple links.

6. The method of claim 1, wherein invoking the reassembly procedure comprises determining that a plurality of receive queues that are respectively associated with the multiple links are non-empty and an expected next sequence numbered fragment is not present.

7. The method of claim 1, wherein invoking the reassembly procedure comprises selecting a smallest sequence numbered fragment from a plurality of receive queues that are respectively associated with the multiple links.

8. A method of processing a packet, comprising:

distributing, at an interface of a link layer and a physical layer, variable length fragments of the packet across multiple links for transmission such that the variable lengths are dynamically adjusted based on respective dynamically realized bandwidths of the links;

wherein differences in the lengths of the variable length fragments are based on differences between the dynamically realized bandwidths of the links.

9. The method of claim 8, wherein the variable lengths are based on each of the multiple links having a transmit queue associated therewith and sizes of the transmit queues are based on nominal bandwidths of the multiple links.

10. The method of claim 9, wherein each transmit queue has a full threshold associated therewith that is based on the nominal bandwidth of the respective link, the method further comprising:

filling a respective one of the transmit queues until reaching the full threshold; and filling another respective one of the transmit queues until reaching the full threshold responsive to filling the respective one of the transmit queues.

11. The method of claim 10, wherein each transmit queue has an advance threshold such that if the end of the packet is reached in the transmit queue and the advance threshold is exceeded, then the respective transmit queue is not filled to the full threshold and additional fragments from another packet are placed in others of the transmit queues.

12. The method of claim 9, wherein each transmit queue has an empty threshold associated therewith that is based on the nominal bandwidth of the respective link and a latency associated with servicing the respective transmit queue responsive to notification that the respective transmit queue's fill level has fallen below the empty threshold.

13. A system for processing a packet, comprising:

means for segmenting a block of data into variable length fragments for transmission over multiple links;

means for assigning a fragment header that comprises a sequence number and a end-of-packet demarcation flag that indicates the end of the packet for each respective fragment;

means for ordering the fragments based on the sequence numbers; and means for invoking a reassembly procedure if at least one of the fragments is lost;

wherein segmenting the block of data, assigning the fragment header, ordering the fragments, and invoking the reassembly procedure are performed at an interface of a link layer and a physical layer; and wherein the respective lengths of the fragments allocated to the respective multiple links for transmission are based on respective dynamically realizable bandwidths for the multiple links.

14. The system of claim 13, wherein the fragment header further comprises a start-of-packet demarcation flag.

15. The system of claim 14, wherein the fragment header further comprises a cyclic redundancy check for the sequence number, end-of-packet demarcation flag, and start-of-packet demarcation flag.

16. The system of claim 13, wherein the means for invoking the reassembly procedure comprises:

means for setting a timer upon receipt of one of the fragments; and means for declaring one of the fragments lost if the timer expires before an expected next sequence numbered fragment arrives.

17. The system of claim 16, wherein the timer has a timeout value that is a function of the latency of a slowest one of the multiple links.

18. The system of claim 13 wherein the means for invoking the reassembly procedure comprises means for determining that a plurality of receive queues that are respectively associated with the multiple links are non-empty and an expected next sequence numbered fragment is not present.

19. The system of claim 13, wherein the means for invoking the reassembly procedure comprises means for selecting a smallest sequence numbered fragment from a plurality of receive queues that are respectively associated with the multiple links.

20. A system for processing a packet, comprising:

means for distributing, at an interface of a link layer and a physical layer, variable length fragments of the packet across multiple links for transmission such that the variable lengths are dynamically adjusted based on respective dynamically realized bandwidths of the links;

wherein differences in the lengths of the variable length fragments are based on differences between the dynamically realized bandwidths of the links.

21. The system of claim 20, wherein the variable lengths are based on each of the multiple links having a transmit queue associated therewith and sizes of the transmit queues are based on nominal bandwidths of the multiple links.

22. The system of claim 21, wherein each transmit queue has a full threshold associated therewith that is based on the nominal bandwidth of the respective link, the system further comprising:

means for filling a respective one of the transmit queues until reaching the full threshold; and means for filling another respective one of the transmit queues until reaching the full threshold responsive to filling the respective one of the transmit queues.

23. The system of claim 22, wherein each transmit queue has an advance threshold such that if the end of the packet is reached in the transmit queue and the advance threshold is exceeded, then the respective transmit queue is not filled to the full threshold and additional fragments from another packet are placed in others of the transmit queues.

24. The system of claim 21, wherein each transmit queue has an empty threshold associated therewith that is based on the nominal bandwidth of the respective link and a latency associated with servicing the respective transmit queue responsive to notification that the respective transmit queue's fill level has fallen below the empty threshold.

25. A computer program product for processing a packet, comprising:
    a non-transitory computer readable program medium having computer readable program code embodied therein, the computer readable program code comprising:
    computer readable program code configured to segment a block of data into variable length fragments for transmission over multiple links;
    computer readable program code configured to assign a fragment header that comprises a sequence number and a end-of-packet demarcation flag that indicates the end of the packet for each respective fragment;
    computer readable program code configured to order the fragments based on the sequence numbers; and
    computer readable program code configured to invoke a reassembly procedure if at least one of the fragments is lost;
    wherein segmenting the block of data, assigning the fragment header, ordering the fragments, and invoking the reassembly procedure are performed at an interface of a link layer and a physical layer; and
    wherein the respective lengths of the fragments allocated to the respective multiple links for transmission are based on respective dynamically realizable bandwidths for the multiple links.

26. The computer program product of claim 25, wherein the fragment header further comprises a start-of-packet demarcation flag.

27. The computer program product of claim 26, wherein the fragment header further comprises a cyclic redundancy check for the sequence number, end-of-packet demarcation flag, and start-of-packet demarcation flag.

28. The computer program product of claim 25, wherein the computer readable program code configured to invoke the reassembly procedure comprises:
    computer readable program code configured to set a timer upon receipt of one of the fragments; and
    computer readable program code configured to declare one of the fragments lost if the timer expires before an expected next sequence numbered fragment arrives.

29. The computer program product of claim 28, wherein the timer has a timeout value that is a function of the latency of a slowest one of the multiple links.

30. The computer program product of claim 25 wherein the computer readable program code configured to invoke the reassembly procedure comprises computer readable program code configured to determine that a plurality of receive queues that are respectively associated with the multiple links are non-empty and an expected next sequence numbered fragment is not present.

31. The computer program product of claim 25, wherein the computer readable program code configured to invoke the reassembly procedure comprises computer readable program code configured to select a smallest sequence numbered fragment from a plurality of receive queues that are respectively associated with the multiple links.

32. A computer program product for processing a packet, comprising:
    a non-transitory computer readable program medium having computer readable program code embodied therein, the computer readable program code comprising:
    computer readable program code configured to distribute, at an interface of a link layer and a physical layer, variable length fragments of the packet across multiple links for transmission such that the variable lengths are dynamically adjusted based on respective dynamically realized bandwidths of the links;
    wherein differences in the lengths of the variable length fragments are based on differences between the dynamically realized bandwidths of the links.

33. The computer program product of claim 32, wherein the variable lengths are based on each of the multiple links having a transmit queue associated therewith and sizes of the transmit queues are based on nominal bandwidths of the multiple links.

34. The computer program product of claim 33, wherein each transmit queue has a full threshold associated therewith that is based on the nominal bandwidth of the respective link, the computer program product further comprising:
    computer readable program code configured to fill a respective one of the transmit queues until reaching the full threshold; and
    computer readable program code configured to fill another respective one of the transmit queues until reaching the full threshold responsive to filling the respective one of the transmit queues.

35. The computer program product of claim 34, wherein each transmit queue has an advance threshold such that if the end of the packet is reached in the transmit queue and the advance threshold is exceeded, then the respective transmit queue is not filled to the full threshold and additional fragments from another packet are placed in others of the transmit queues.

36. The computer program product of claim 33, wherein each transmit queue has an empty threshold associated therewith that is based on the nominal bandwidth of the respective link and a latency associated with servicing the respective transmit queue responsive to notification that the respective transmit queue's fill level has fallen below the empty threshold.

* * * * *

UNITED STATES PATENT AND TRADEMARK OFFICE
CERTIFICATE OF CORRECTION

| | | |
|---|---|---|
| PATENT NO. | : 9,130,772 B1 | |
| APPLICATION NO. | : 10/438709 | |
| DATED | : September 8, 2015 | |
| INVENTOR(S) | : Goodchild et al. | |

It is certified that error appears in the above-identified patent and that said Letters Patent is hereby corrected as shown below:

In The Specification
Column 8, Line 23: Please insert the following paragraph at Line 23:

--Note that, in accordance with some embodiments of the present invention, communication link(s) may be gracefully dropped by no longer allocating packet fragments for transmission on those link(s). There is no expectation at the receiving end for packet fragments to arrive on every communication link; the idle link is simply ignored.--

Signed and Sealed this
Fourteenth Day of June, 2016

Michelle K. Lee
*Director of the United States Patent and Trademark Office*